United States Patent
Chen et al.

(10) Patent No.: US 11,080,368 B2
(45) Date of Patent: Aug. 3, 2021

(54) DIGITAL RIGHTS MANAGEMENT SYSTEM AND DIGITAL RIGHTS PROTECTION METHOD

(71) Applicant: Industrial Technology Research Institute, Hsinchu (TW)

(72) Inventors: Shih-An Chen, Hsinchu (TW); Wen-Kuei Lai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 356 days.

(21) Appl. No.: 16/235,821

(22) Filed: Dec. 28, 2018

(65) Prior Publication Data
US 2020/0175136 A1 Jun. 4, 2020

(30) Foreign Application Priority Data
Nov. 30, 2018 (TW) .................. 107142865

(51) Int. Cl.
*H04L 29/06* (2006.01)
*G06F 21/10* (2013.01)
(Continued)

(52) U.S. Cl.
CPC .......... *G06F 21/10* (2013.01); *H04L 9/0637* (2013.01); *H04L 9/0643* (2013.01);
(Continued)

(58) Field of Classification Search
CPC ..... G06F 21/10; H04L 9/0637; H04L 9/0643; H04L 9/0869; H04L 63/102; H04L 2209/38; H04L 2463/101
See application file for complete search history.

(56) References Cited

U.S. PATENT DOCUMENTS

2011/0047080 A1* 2/2011 Im .................. G06F 21/10
705/59
2017/0116693 A1* 4/2017 Rae ................. H04L 9/3236
(Continued)

FOREIGN PATENT DOCUMENTS

CN 106250721 12/2016
CN 106600405 A 4/2017
(Continued)

OTHER PUBLICATIONS

Zhaofeng, Ma, Huang Weihua, and Gao Hongmin. "A new blockchain-based trusted DRM scheme for built-in content protection." EURASIP Journal on Image and Video Processing Jan. 2018 (2018): 1-12. (Year: 2018).*

*Primary Examiner* — Shawnchoy Rahman
(74) *Attorney, Agent, or Firm* — Mintz Levin Cohn Ferris Glovsky and Popeo, P.C.; Peter F. Corless; Steven M. Jensen (57) ABSTRACT

A digital rights management system and a digital rights management method are provided. The digital rights management system includes an authority management module, a user confirmation module and an authority blockchain. The authority management module is configured for: receiving a user authority information corresponding to a user end from a service providing; sending user authority information to the user confirmation module; receiving an identification code corresponding to the user authority information from the user confirmation module; and sending and storing the user authority information and the identification code into the authority blockchain. Therefore, the authority management module, the user confirmation module and the authority blockchain manage and protect digital rights.

13 Claims, 6 Drawing Sheets

(51) Int. Cl.
*H04L 9/06* (2006.01)
*H04L 9/08* (2006.01)

(52) U.S. Cl.
CPC .......... *H04L 9/0869* (2013.01); *H04L 63/102* (2013.01); *H04L 2209/38* (2013.01); *H04L 2463/101* (2013.01)

(56) References Cited

U.S. PATENT DOCUMENTS

| | | |
|---|---|---|
| 2017/0134161 A1 | 5/2017 | Goeringer et al. |
| 2018/0068091 A1 | 3/2018 | Gaidar et al. |
| 2018/0115416 A1* | 4/2018 | Diehl .................. H04L 9/0838 |
| 2020/0007322 A1* | 1/2020 | Weldemariam ......... G06F 16/27 |

FOREIGN PATENT DOCUMENTS

| | | |
|---|---|---|
| CN | 106992990 A | 7/2017 |
| CN | 107086920 | 8/2017 |
| CN | 107145768 | 9/2017 |
| CN | 107171785 | 9/2017 |
| CN | 107659610 | 2/2018 |
| CN | 107679045 | 2/2018 |
| CN | 107679369 | 2/2018 |
| CN | 107967416 | 4/2018 |
| CN | 108776941 A | 11/2018 |
| TW | 201816638 A | 5/2018 |

* cited by examiner

FIG. 6

DIGITAL RIGHTS MANAGEMENT SYSTEM AND DIGITAL RIGHTS PROTECTION METHOD

CROSS-REFERENCE TO RELATED APPLICATIONS

This application claims priority to Taiwanese Application Serial No. 107142865, filed on Nov. 30, 2018. The entirety of the above-mentioned patent application is hereby incorporated by reference herein and made a part of this specification.

1. TECHNICAL FIELD

The disclosure relates to digital rights management and protection techniques, and, more particularly, to a digital rights management system and a digital rights management method.

2. DESCRIPTION OF RELATED ART

Digital rights management (DRM) is a protection and management mechanism for digital data, including the embedding of a watermark and the encrypting of digital contents. The embedding of a watermark can ensure who owns the rights of the digital contents. The encrypting of digital contents protects the digital contents from being accessed illegally by a third party. The authorities of DRM are divided into three independent structures, including an organization structure in terms of people, a content structure in terms of writings, and an authorization structure in terms of authorization items.

DRM has three function and mode application stages: (1) the production of electronic publications; (2) the authorization protection of shelfed publications; and (3) on-line purchase and download services in a system. However, DRM cannot guarantee the correctness of the authority of a user end.

Moreover, in a DRM system according to the prior art, since a provider manages both an authority server and a content server, a user end is thus likely to loss his right if the authority server is hacked or personnel of the provider change authority of the user end at their will arbitrarily.

Therefore, how to solve the problem of the prior art to manage and protect the user authority information and the identification code of a user end is becoming an urgent issue in the art.

SUMMARY

The disclosure provides a digital rights management system and a digital rights management method, which manage and protect user authority information and identification codes through an authority management module, a user confirmation module and an authority blockchain.

In an exemplary embodiment of the disclosure, a digital rights management system includes an authority management module, a user confirmation module and an authority blockchain, wherein the authority management module is configured for: receiving a user authority information corresponding to a user end from a service providing end; sending the user authority information to the user confirmation module; receiving an identification code corresponding to the user authority information from the user confirmation module; and sending and storing the user authority information and the identification code corresponding to the user authority information to the authority blockchain.

In another exemplary embodiment of the disclosure, a digital rights management method includes: receiving, by an authority management module, a user authority information corresponding to a user end from a service providing end; sending, by the authority management module, the user authority information to a user confirmation module; receiving, by the authority management module, an identification code corresponding to the user authority information from the user confirmation module; and sending and storing, by the authority management module, the user authority information and the identification code corresponding to the user authority information to an authority blockchain.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
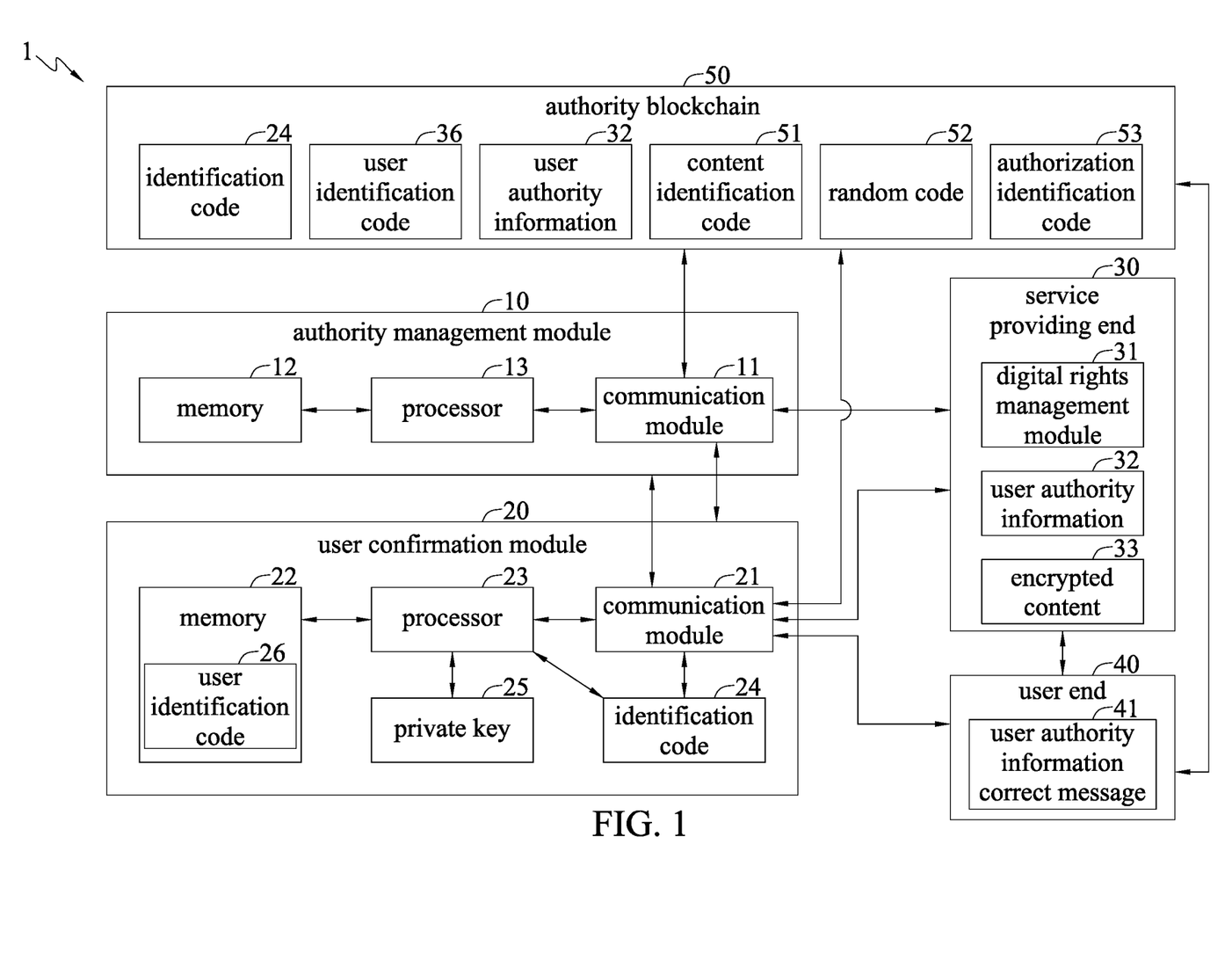
FIG. 1 is a schematic diagram of an architecture of a digital rights management system according to an exemplary embodiment of the disclosure.

FIG. 1 is a schematic diagram of an architecture of a digital rights management system 1 according to an exemplary embodiment of the disclosure. The digital rights management system 1 can manage an authority blockchain 50, and is connected to a service providing end 30 and a user end 40. The digital rights management system 1 comprises an authority management module 10, a user confirmation module 20 and an authority blockchain 50. The authority management module 10 may comprise a communication module 11, a memory 12, and a processor 13 connected to the communication module 11 and the memory 12.

In an exemplary embodiment of the disclosure, the authority management module 10 is a server etc., the communication module 11 is a communication interface, a transceiver or an antenna, the memory 12 is a hard drive (e.g., a cloud or network hard drive), a soft drive, an optical disk, a memory card, a register, a flash drive etc., the processor 13 is a central processing unit (CPU), a microprocessor or a processing chip etc., the user confirmation module 20 is an electronic device, such as a server and user equipment, the user end 40 is an electronic device, such as user equipment (e.g., a computer and a mobile device), and the user confirmation module 20 is a standalone electronic device or is integrated with the user end 40 into a single electronic device. In another exemplary embodiment of the disclosure, the above-mentioned server is a remote server, a cloud server or a network server, the computer is a laptop computer, a personal computer or a tablet computer, and the mobile device is a smart phone or a smart watch.

The processor 13 of the authority management module 10 is configured to: drive the communication module 11 of the authority management module 10 to receive the user authority information 32 corresponding to the user end 40 from the service providing end 30; drive the communication module 11 of the authority management module 10 to send the user authority information 32 to the user confirmation module 20; drive the communication module 11 of the authority management module 10 to receive an identification code 24 (e.g., a confirmation serial number) corresponding to the user authority information 32 from the user confirmation module 20; and drive the communication module 11 of the authority management module 10 to send and store the user authority information 32 and the identification code 24 corresponding to the user authority information 32 to the authority blockchain 50. In an exemplary embodiment of the disclosure, the user authority information 32 can represent the usage authority of the user end 40 to the rights data, and the rights data can be, but not limited to A/V data (e.g., TV programs, movies, dramas, films and pictures), music data (e.g., music and songs), literature data (e.g., literature works and electronic books), or arts data (e.g., paintings, photos and anime).

The user confirmation module 20 may comprise a communication module 21, a memory 22, and a processor 23 connected to the communication module 21 and the memory 22. The processor 23 of the user confirmation module 20 is configured to: drive the communication module 21 of the user confirmation module 20 to send the user authority information 32 to the user end 40; drive the communication module 21 of the user confirmation module 20 to receive a user authority information correct message 41 sent back by the user end 40 based on the user authority information 32, wherein the user authority information correct message 41 represents that the user end 40 has confirmed that the user authority information 32 is correct; perform an operation in response to the received user authority information correct message 41 to generate the identification code 24; and drive the communication module 21 of the user confirmation module 20 to send the identification code 24.

The processor 23 of the user confirmation module 20 is further configured to: drive the communication module 21 of the user confirmation module 20 to acquire at least one random code 52 corresponding to the user end 40 from the authority blockchain 50, wherein the random code 52 may be a Hash code; and performing an encryption operation on the at least one random code 52 based on a private key 25 corresponding to the user end 40 to generate the identification code 24. The processor 23 of the user confirmation module 20 is further configured to: store the identification code 24 and a user identification code (ID) 26 corresponding to the user end 40 in the memory 22 of the user confirmation module 20. The processor 23 of the user confirmation module 20 is further configured to: drive the communication module 21 of the user confirmation module 20 to send the identification code 24 to the user end 40.

The processor 23 of the user confirmation module 20 is further configured to: drive the communication module 21 of the user confirmation module 20 to read or look up an authorization identification code 53 corresponding to the user end 40 from the authority blockchain 50; determining whether the authorization identification code 53 is the same as the identification code 24 stored in the user confirmation module 20 or not; and, after it is determined that the authorization identification code 53 is different from the identification code 24, drive the communication module 21 of the user confirmation module 20 to send a rights abnormal message to the service providing end 30 and the user end 40, thereby notifying the service providing end 30 and the user end 40 that the authorization identification code 53 stored in the authority blockchain 50 is abnormal or has been amended.

Figure 2:
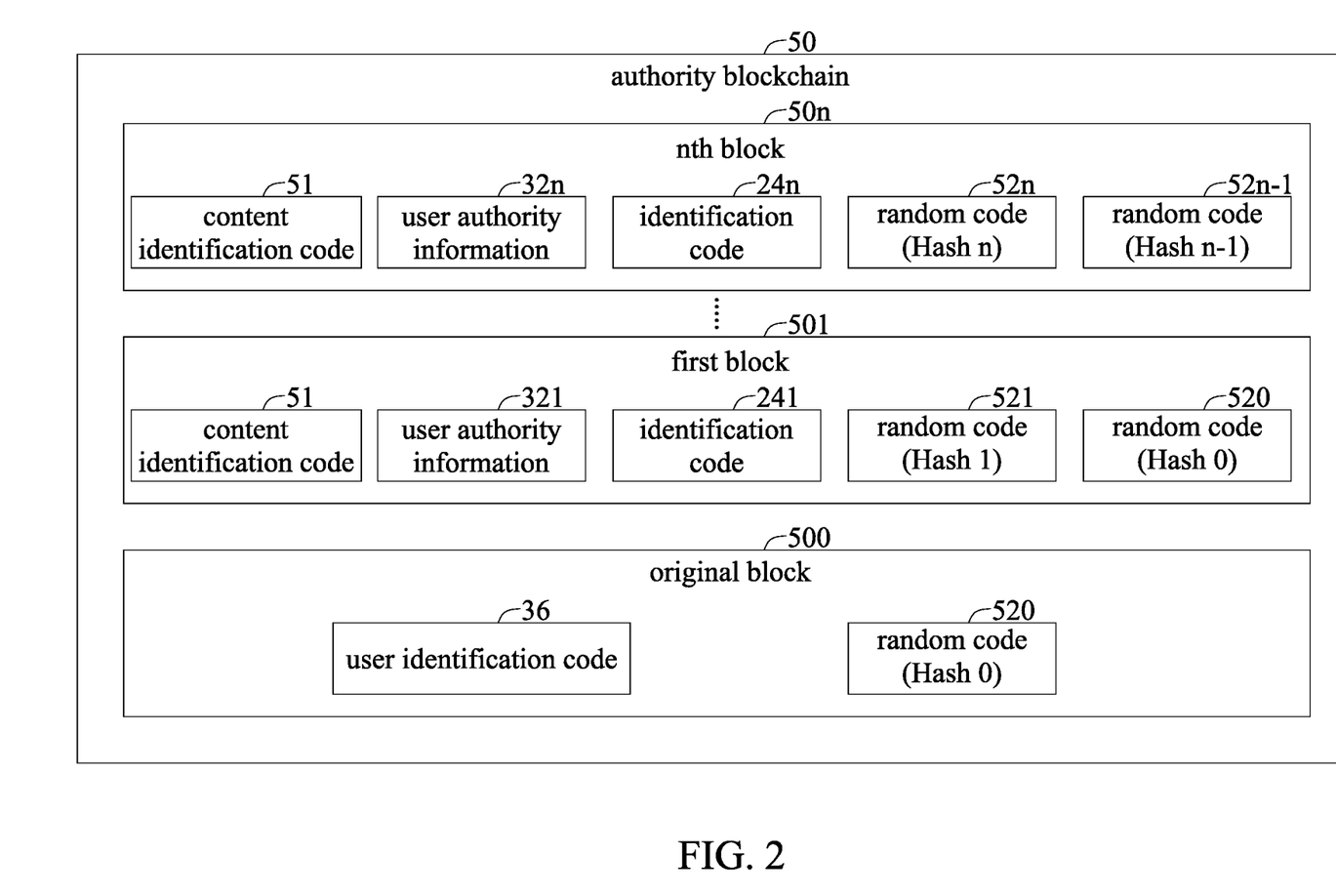
FIG. 2 is a schematic diagram of an architecture of an authority blockchain of a digital rights management system according to an exemplary embodiment of the disclosure.

FIG. 2 is a schematic diagram of an architecture of an authority blockchain 50 of the authority management module 10 according to an exemplary embodiment of the disclosure. Please also refer to FIG. 1. The updating of the authority blockchain 50 accessed by the user end 40 starts at an original block 500, and then from a first block 501 to an nth block $50n$, one at a time.

In an exemplary embodiment of the disclosure, the original block 500 records the user identification code 36 and a random code (e.g., Hash 0), without recording the user authority information $321$ to $32n$. The first block 501 records the user authority information 321 that is not updated ever and the only one non-repetitive identification code 241 (e.g., a confirmation serial number 1), and the nth block $50n$ records the user authority information $32n$ that has be updated 50 times and the only non-repetitive identification code $24n$ (e.g. a confirmation serial number n). The user confirmation module 20 performs an encryption operation on at least one random code 521 based on the private key 25 corresponding to the user end 40 and obtains the identification code 241. The user confirmation module 20 performs the encryption operation on at least one random code $52n$ based on the private key 25 corresponding to the user end 40 and obtains the identification code $24n$. The random codes 521 to $52n-1$ and $52n$ can be different Hash codes (e.g., Hash 1 to Hash n−1 and Hash n).

Figure 3:
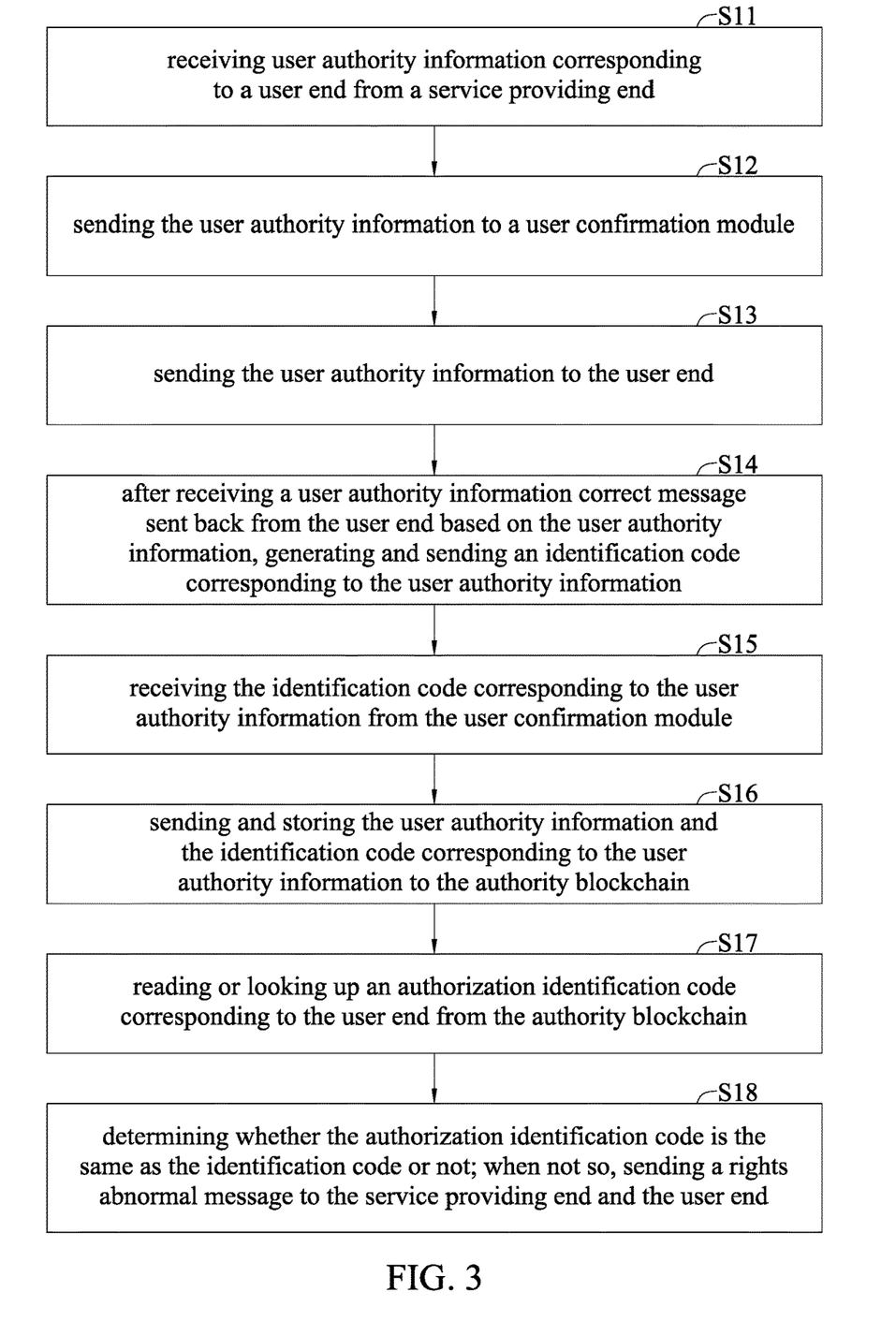
FIG. 3 is a flow chart of a digital rights management method according to an exemplary embodiment of the disclosure.

FIG. 3 is a flow chart of a digital rights management method according to an exemplary embodiment of the disclosure. Please also refer to FIG. 1. The digital rights management method of FIG. 3 can manage an authority blockchain 50, and include steps S11-S18, with the remaining technical contents similar to the described in FIGS. 1 and 2, further description thereof hereby omitted.

In S11 of FIG. 3, an authority management module 10 receives, a user authority information 32 corresponding to a user end 40 from a service providing end 30.

In S12 of FIG. 3, the authority management module 10 sends the user authority information 32 to a user confirmation module 20.

In S13 of FIG. 3, the user confirmation module 20 sends the user authority information 32 to the user end 40.

In S14 of FIG. 3, after the user confirmation module 20 receives a user authority information correct message 41 sent back from the user end 40 based on the user authority information 32, the user confirmation module 20 generates and sends an identification code 24 (e.g., a confirmation serial number) corresponding to the user authority information 32, wherein the user authority information correct message 41 represents that the user end 40 has confirmed that the user authority information 32 is correct.

In step S14, the user confirmation module 20 can acquire at least one random code 52 corresponding to the user end 40 from a authority blockchain 50, and encrypt the at least one random code 52 based on a private key 25 corresponding to the user end 40 to generate an identification code 24. The memory 22 of the user confirmation module 20 may store the identification code 24 and a user identification code 26 corresponding to the user end 40. The user confirmation module 20 may send the identification code 24 to the user end 40.

In S15 of FIG. 3, the authority management module 10 receives the identification code 24 corresponding to the user authority information 32 from the user confirmation module 20.

In S16 of FIG. 3, the authority management module 10 sends and stores the user authority information 32 and the identification code 24 corresponding to the user authority information 32 to the authority blockchain 50.

In S17 of FIG. 3, the user end 40 or the user confirmation module 20 reads or looks up an authorization identification code 53 corresponding to the user end 40 from the authority blockchain 50.

In S18 of FIG. 3, the user confirmation module 20 determines whether the authorization identification code 53 is the same as the identification code 24 stored in the user confirmation module 20 or not. When the authorization identification code 53 is the same as the identification code 24, the method ends. When the authorization identification code 53 is different from the identification code 24, the user confirmation module 20 sends a rights abnormal message to the service providing end 30 and the user end 40, to notify the service providing end 30 and the user end 40 that the authorization identification code 53 stored in the authority blockchain 50 is abnormal or has been amended.

Figure 4:
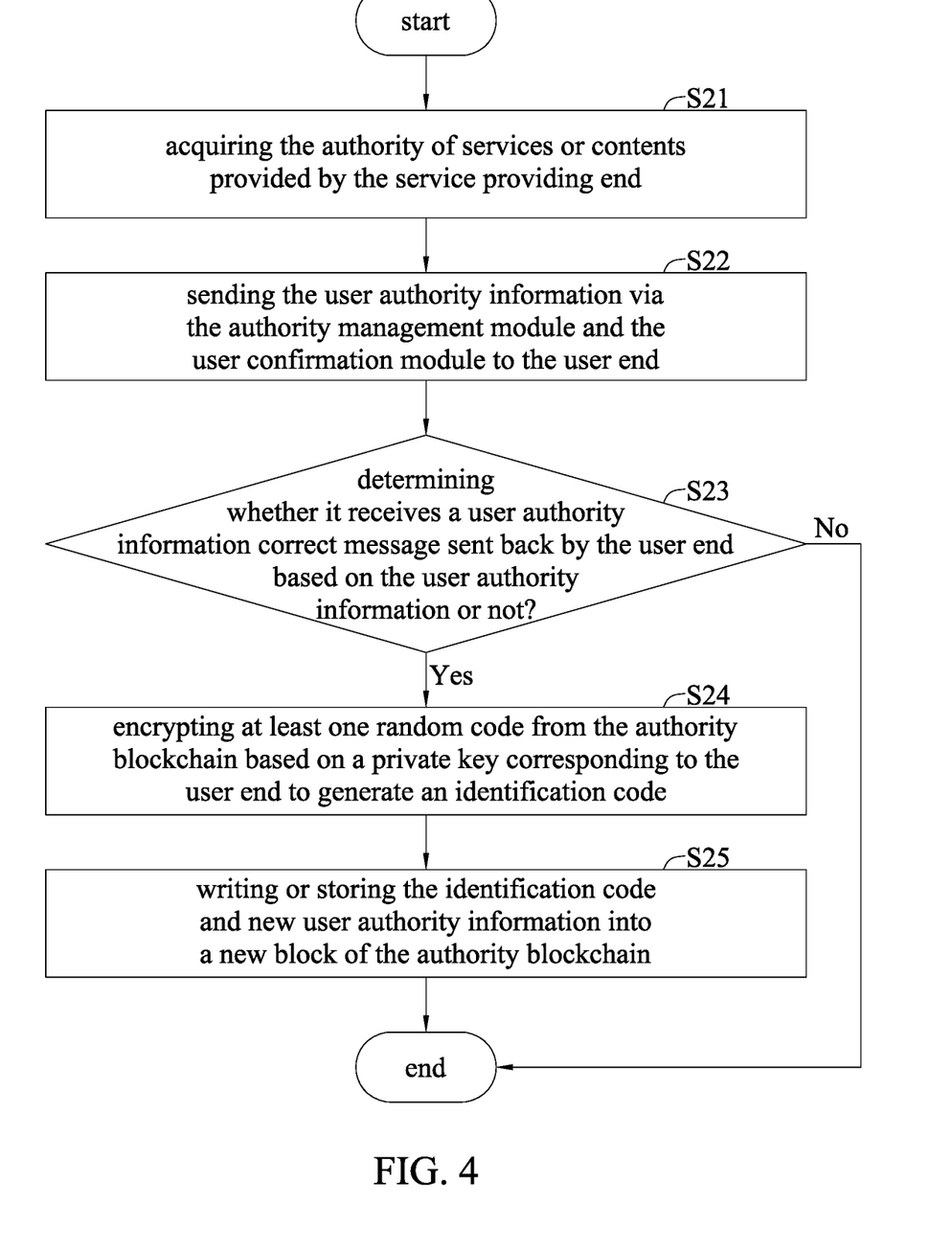
FIG. 4 is a flow chart illustrating how a user end in a digital rights management method acquires authority according to an exemplary embodiment of the disclosure.

FIG. 4 is a flow chart illustrating how the user end 40 acquire authority in a digital rights management method according to an exemplary embodiment of the disclosure. Please also refer to FIGS. 1 and 2. As shown in FIG. 4, when the user end of FIG. 1 purchases or acquires in other ways the authority of services or contents provided by the service providing end 30, a new block of the authority blockchain 50 may be newly added (e.g., a block 50n of the authority blockchain 50 of FIG. 2).

In step S21 of FIG. 4, the user end 40 acquires the authority of services or contents provided by the service providing end 30.

In step S22 of FIG. 4, the service providing end 30 sends the user authority information 32 via the authority management module 10 and the user confirmation module 20 to the user end 40.

In step S23 of FIG. 4, the user confirmation module 20 determines whether it receives a user authority information correct message 41 sent back by the user end 40 based on the user authority information 32 or not. If so, (it receives the user authority information correct message 41), the method proceeds to step S24; otherwise (it does not receive the user authority information correct message 41), the method ends.

In step S24 of FIG. 4, after the user confirmation module 20 receives the user authority information correct message 41 sent back from the user end 40 based on the user authority information 32, which indicates that the user end 40 has confirmed that the user authority information 32 is correct, the user confirmation module 20 encrypts at least one random code 52 from the authority blockchain 50 based on a private key 25 corresponding to the user end 40 to generate an identification code 24 (e.g., a confirmation serial number).

In step S25 of FIG. 4, the authority management module 10 writes or stores the identification code 24 and new user authority information 32 into a new block of the authority blockchain 50 (e.g., the block 50n of the authority blockchain 50 of FIG. 2).

Figure 5:
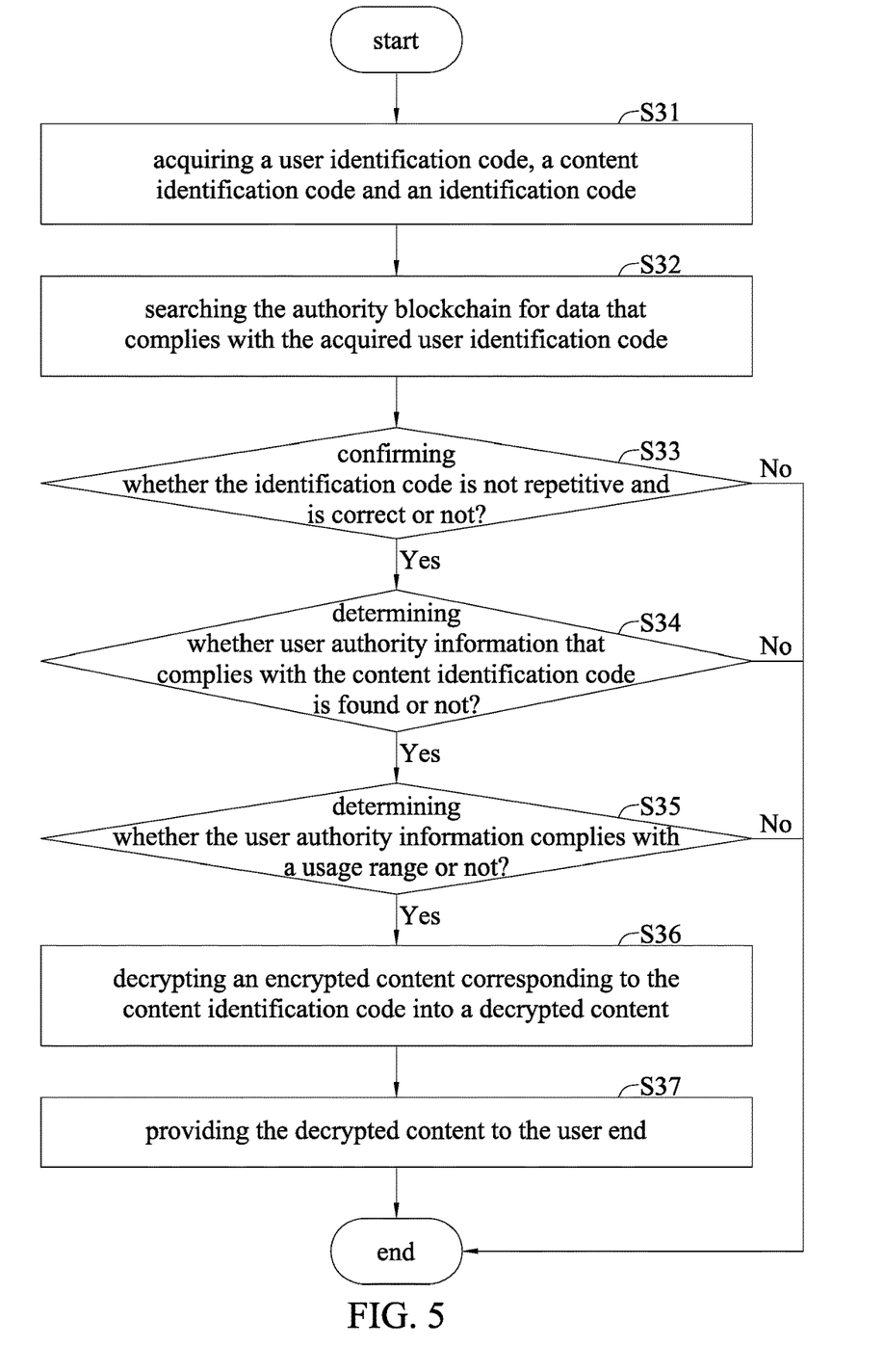
FIG. 5 is a flow chart illustrating how a digital rights management module of a service providing end in a digital rights management method helps a user end enforce his usage authority according to an exemplary embodiment of the disclosure.

FIG. 5 is a flow chart illustrating how a digital rights management module 31 of a service providing end 30 in a digital rights management method helps a user end 40 enforce his usage authority according to an exemplary embodiment of the disclosure. Please also refer to FIG. 1.

In step S31 of FIG. 5, the digital rights management module 31 of the service providing end 30 acquires a user identification code 26, a content identification code 51 and an identification code 24 (e.g., a confirmation serial number).

In step S32 of FIG. 5, the digital rights management module 31 searches the authority blockchain 50 for data that complies with the acquired user identification code 26, and reads the data of the authority blockchain 50.

In step S33 of FIG. 5, the digital rights management module 31 identifies the identification code 24 to confirm whether the identification code 24 is not repetitive and is correct. If so (the identification code 24 is not repetitive and is correct) or not, the method proceeds to step S34; otherwise (the identification code 24 is repetitive or is not correct), the method ends.

In step S34 of FIG. 5, the digital rights management module 31 identifies the content identification code 51 and searches for user authority information 32 that complies with the content identification code 51. When the digital rights management module 31 finds the user authority information 32 that complies with the content identification code 51, the method proceeds to step S35; otherwise (when the digital rights management module 31 does not find the user authority information 32 that complies with the content identification code 51), the method ends.

In step S35 of FIG. 5, the digital rights management module 31 identifies or determines whether the user authority information 32 complies with a usage range or not. If so (the user authority information 32 complies with the usage range), the method proceeds to step S36; otherwise (the user authority information 32 does not comply with the usage range), the method ends.

In step S36 of FIG. 5, the digital rights management module 31 decrypts an encrypted content 33 corresponding to the content identification code 51 into a decrypted content. In an exemplary embodiment of the disclosure, the encrypted content 33 is a content of encrypted (original or complete) rights data, the decrypted content is a content of rights data that can be read, broadcast, perused or displayed, and the rights data are, but not limited to A/V data (e.g., TV programs, movies, dramas, films and pictures), music data (e.g., music and songs), literature data (e.g., literature works and electronic books), or arts data (e.g., paintings, photos and anime).

In step S37 of FIG. 5, the digital rights management module 31 provides the decrypted content to the user end 40, i.e., sending the decrypted content to the user end 40.

Figure 6:
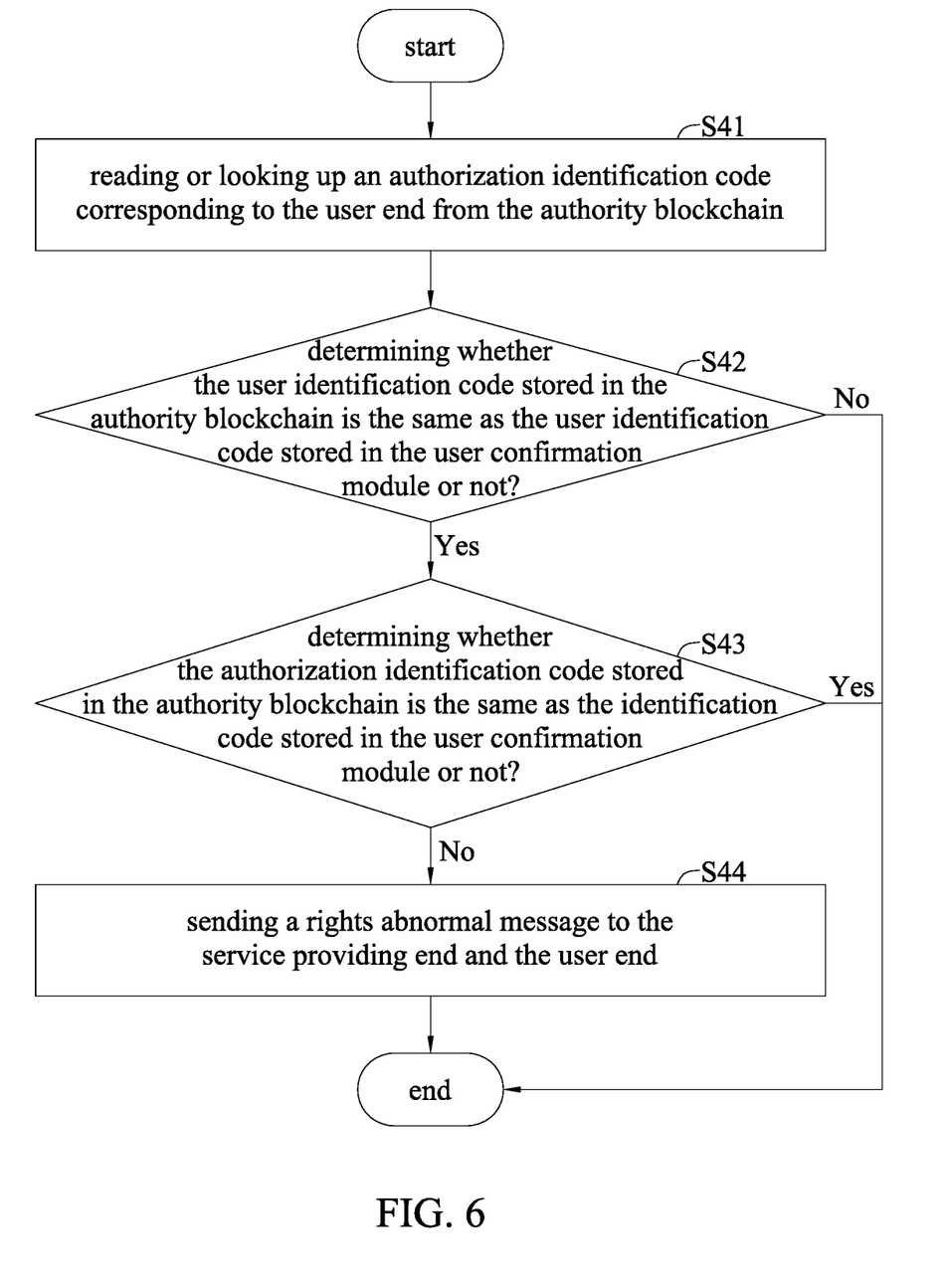
FIG. 6 is a flow chart illustrating how a user end or a user confirmation module looks up or monitors an authority blockchain in a digital rights management method according to an exemplary embodiment of the disclosure.

FIG. 6 is a flow chart illustrating how a user end 40 or a user confirmation module 20 looks up or monitors an authority blockchain 50 in a digital rights management method according to an exemplary embodiment of the disclosure. Please also refer to FIG. 1.

In step S41 of FIG. 6, the user end 40 or the user confirmation module 20 reads or looks up an authorization identification code 53 corresponding to the user end 40 from the authority blockchain 50.

In step S42 of FIG. 6, the user confirmation module 20 determines whether the user identification code 36 stored in the authority blockchain 50 is the same as the user identification code 26 stored in the user confirmation module 20 or not. If so (the user identification code 36 stored in the authority blockchain 50 is the same as the user identification code 26 stored in the user confirmation module 20), the method proceeds to step S43; otherwise (the user identification code 36 stored in the authority blockchain 50 is different from the user identification code 26 stored in the user confirmation module 20), the method ends.

In step S43 of FIG. 6, the user confirmation module 20 determines whether the authorization identification code 53 stored in the authority blockchain 50 is the same as the identification code 24 stored in the user confirmation module 20 or not. If so (the authorization identification code 53 stored in the authority blockchain 50 is the same as the identification code 24 stored in the user confirmation module 20), which indicates that the authorization identification code 53 stored in the authority blockchain 50 is correct (without being amended), the method ends; otherwise (the authorization identification code 53 stored in the authority blockchain 50 is different from the identification code 24 stored in the user confirmation module 20), which indicates that the authorization identification code 53 stored in the authority blockchain 50 has been amended (e.g., amended maliciously), the method proceeds to step S44.

In step S44 of FIG. 6, the user confirmation module 20 sends a rights abnormal message to the service providing end 30 and the user end 40 to notify the service providing end 30 and the user end 40 that the authorization identification code 53 stored in the authority blockchain 50 is abnormal or has been amended.

In sum, a digital rights management system and a digital rights management method according to an exemplary embodiment of the disclosure have at least the following features, benefits or technical efficacy.

According to an exemplary embodiment of the disclosure, an authority management module can receive a user authority information corresponding to a user end from a service providing end, send the user authority information to a user confirmation module, receive an identification code corresponding to the user authority information from the user confirmation module, and send and store the user authority information and the identification code into an authority blockchain. Therefore, the authority management module, the user confirmation module and the authority blockchain manage and protect the user authority information and the identification code.

According to another exemplary embodiment of the disclosure, the user confirmation module can generate and send an identification code (e.g., a confirmation serial number) corresponding to user authority information after receiving a user authority information correct message sent back by the user end based on the user authority information, allowing the user end to confirm that the user authority information is correct in advance and protect the user authority information of the user end.

According to another exemplary embodiment of the disclosure, the user end or the user confirmation module can read or look up the authorization identification code corresponding to the user end from the authority blockchain, and the user confirmation module can send the rights abnormal message to the service providing end and the user end after the user confirmation module has determined that the authorization identification code is different from the identification code, which indicates that the authorization identification code stored in the authority blockchain is abnormal or has been amended, to protect the authorization identification code of the user end.

It will be apparent to those skilled in the art that various modifications and variations can be made to the exemplary embodiments disclosed. It is intended that the specification and examples be considered as exemplary only, with a true scope of the disclosure being indicated by the following claims and their equivalents.

What is claimed is:

1. A digital rights management system, the digital rights management system comprising an authority management module comprising a processor, a user confirmation module comprising a processor, and an authority blockchain comprising a plurality of blocks of user authority information, wherein the authority management module is configured for:
   receiving the user authority information corresponding to a user end from a service providing end;
   sending the user authority information to the user confirmation module;
   receiving an identification code corresponding to the user authority information from the user confirmation module; and
   sending and storing the user authority information and the identification code corresponding to the user authority information to the authority blockchain,
wherein the user confirmation module is configured for:
   sending the user authority information to the user end;
   receiving a user authority information correct message sent back by the user end based on the user authority information;
   performing an operation to generate the identification code, in response to the received the user authority information correct message; and
   sending the identification code.

2. The digital rights management system of claim 1, wherein the user confirmation module is further configured for:
   obtaining at least one random code corresponding to the user end from the authority blockchain; and
   performing an encryption operation to generate the identification code on the at least one random code based on a private key corresponding to the user end.

3. The digital rights management system of claim 1, wherein the user confirmation module is further configured for storing the identification code and a user identification code corresponding to the user end in a memory of the user confirmation module.

4. The digital rights management system of claim 1, wherein the user confirmation module is further configured for sending the identification code to the user end.

5. The digital rights management system of claim 1, wherein the user confirmation module is further configured for:
   reading or looking up an authorization identification code corresponding to the user end from the authority blockchain;
   determining whether the authorization identification code is the same as the identification code stored in the user confirmation module or not;
   sending a rights abnormal message to the service providing end and the user end, when it is determined that the authorization identification code is different from the identification code.

6. A digital rights management method for managing an authority blockchain, the digital rights management method comprising:

receiving, by an authority management module, a user authority information corresponding to a user end from a service providing end;

sending, by the authority management module, the user authority information to a user confirmation module;

receiving, by the authority management module, an identification code corresponding to the user authority information from the user confirmation module;

sending and storing, by the authority management module, the user authority information and the identification code corresponding to the user authority information to an authority blockchain;

prior to receiving the identification code corresponding to the user authority information from the user confirmation module, sending, by the user confirmation module, the user authority information to the user end; and after receiving a user authority information correct message sent back by the user end based on the user authority information, generating, by the user confirmation module, the identification code corresponding to the user authority information.

7. The digital rights management method of claim 6, wherein after the user confirmation module receives the user authority information correct message sent back by the user end based on the user authority information, the user confirmation module generates the identification code by:

obtaining at least one random code corresponding to the user end from the authority blockchain; and encrypting the at least one random code based on a private key corresponding to the user end to generate the identification code.

8. The digital rights management method of claim 6, further comprising sending the identification code to the user end by the user confirmation module.

9. The digital rights management method of claim 6, further comprising:

reading or looking up, by the user end or the user confirmation module, an authorization identification code corresponding to the user end from the authority blockchain;

determining, by the user confirmation module, whether the authorization identification code is the same as the identification code stored in the user confirmation module or not; and sending, by the user confirmation module, when the authorization identification code is different from the identification code a rights abnormal message to the service providing end and the user end.

10. The digital rights management method of claim 6, further comprising:

obtaining, by the user end, the user authority information corresponding to services or contents provided by the service providing end;

encrypting, by the user confirmation module, at least one random code from the authority blockchain based on a private key corresponding to the user end to generate the identification code, after the user confirmation module receives a user authority information correct message sent back by the user end based on the user authority information; and writing or storing, by the authority management module, the identification code and new user authority information into a new block of the authority blockchain.

11. The digital rights management method of claim 6, further comprising:

obtaining, by a digital rights management module of the service providing end, a user identification code, a content identification code and the identification code;

searching for an authority blockchain that complies with the obtained user identification code by the digital rights management module;

identifying, by the digital rights management module, the identification code and the content identification code, and determining whether the user authority information complies with a usage range of the user end or not; and decrypting, by the digital rights management module, an encrypted content corresponding to the content identification code into a decrypted content, and providing, by the digital rights management module, the decrypted content to the user end, when the user authority information complies with the usage range of the user end.

12. The digital rights management method of claim 6, further comprising storing, by the user confirmation module, the identification code and a user identification code corresponding to the user end.

13. The digital rights management method of claim 12, further comprising:

reading or looking up, by the user end or the user confirmation module, the user identification code corresponding to the user end and an authorization identification code from the authority blockchain;

determining, by the user confirmation module, whether the user identification code stored in the authority blockchain is the same as the user identification code stored in the user confirmation module or not;

determining, by the user confirmation module, whether the authorization identification code stored in the authority blockchain is the same as the identification code stored in the user confirmation module or not, when the user identification code stored in the authority blockchain is the same as the user identification code stored in the user confirmation module; and sending, by the user confirmation module, a rights abnormal message to the service providing end and the user end, when the authorization identification code stored in the authority blockchain is different from the identification code stored in the user confirmation module.

* * * * *